Feb. 4, 1958 — J. McD. WILLIS — 2,822,026
METHOD OF BUILDING PNEUMATIC TIRES
Filed Oct. 21, 1952
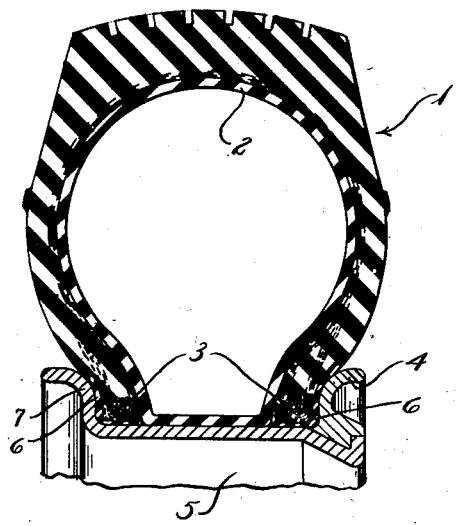
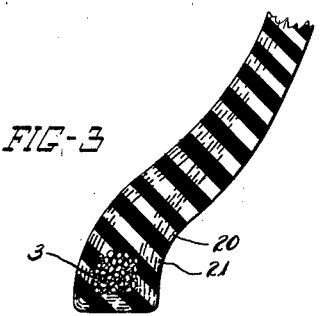
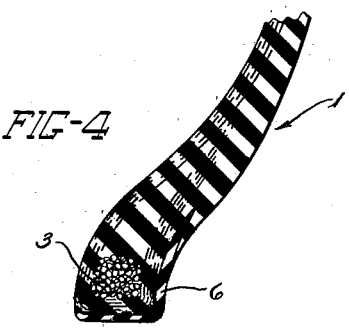
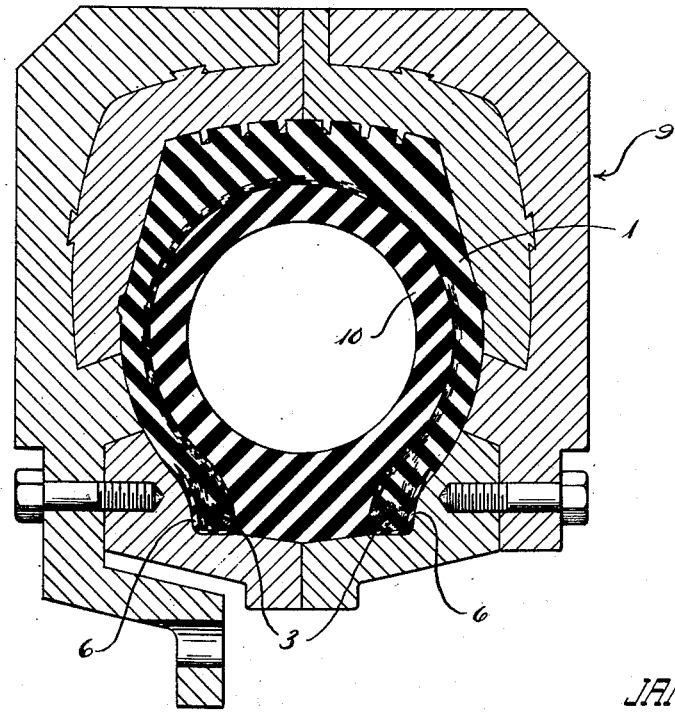
INVENTOR.
JAMES M. WILLIS

United States Patent Office 2,822,026
Patented Feb. 4, 1958

2,822,026

METHOD OF BUILDING PNEUMATIC TIRES

James McDermott Willis, Akron, Ohio, assignor to The Firestone Tire & Rubber Company, Akron, Ohio, a corporation of Ohio Application October 21, 1952, Serial No. 315,979

10 Claims. (Cl. 154—14)

This invention relates to a method of manufacturing vulcanized laminated rubbery articles subjected to extreme heat and molding pressure and more particularly to a method of forming portions of a pneumatic tire such as the bead and chafer portions.

The preferred form of the invention will be described in terms of a method of manufacturing the bead of the pneumatic tire. Such a tire relies for stability on two circular metal bead portions surrounded by the rubber insulated fabric of the tire body, the bead portions for mounting the tire on the rim of the wheel of the vehicle. The practice had been to use fabric plies of the tire body turned alternately up and down respectively around the metal beads to secure the tire body to the beads, the fabric to protect the beads from the rim flange of the wheel. Difficulty was encountered with this construction in that wheel rotation caused the wheel rim flange to rub against the lightly insulated fabric in the bead area to produce scuffing, abrasion, and cutting. As the fabric slowly deteriorated from this action, sand and grit worked between the fabric plies to cause ply separation with resulting tire failure.

The proposal also has been advanced to protect the bead from rim flange rubbing by the use of a rubberized square-woven fabric strip over the body plies in the bead area of the tire. Difficulties have been encountered in using such a rubber-covered strip in that the rubber coating squeezes out of position during vulcanization of the tire in a mold to expose the fabric in the area between the heel of the bead and sidewall of the tire where greatest thickness of rubber is required for protection. The fabric of the chafer strip thus denuded of the rubber coating is unsatisfactory protection to the bead from the rubbing of the rim, since fabric alone has little chafe-resistance.

The use of a protecting strip of vulcanized rubber adhered to the tire between the fabric covered bead and the rim of the wheel on which the wheel was mounted has been proposed. This construction is difficult to attain in a molded tire for the reason that the heat and pressure of tire vulcanization squeezes the rubber away from the bead area such rubber is designed to protect.

It is, therefore, an object of this invention to provide a method of manufacturing a vulcanized rubbery article which is subjected to heat and pressure during vulcanization comprising the combination of the steps of blending two rubbery components—one of which will be stiffened to a dimensionally stable state at a temperature below the stiffening temperatures of the other to hold the article against deformation pressures at elevated temperatures. Another object of the invention is to provide a method of applying a protective strip to the bead portion of the pneumatic tire to protect that portion from the chafing action of the rim on which the tire is mounted. Further object of the invention is to provide a method of manufacturing the bead of a pneumatic tire having a rubber-covering of substantial thickness after vulcanization.

These and other objects are attained through use of a rubbery vulcanizable compound comprised of vulcanizable natural or synthetic rubber and a material which is plastic before treatment with heat but which becomes dimensionally stable after treatment with heat at a temperature below the vulcanizing temperature of the rubber. A preferred form of the invention comprises a blend of thermosetting resin with either natural or synthetic rubber.

Figure 1 is a sectional view of a tire in accordance with the invention mounted on a rim.

Figure 2 is a sectional view of a steam heated tire mold enclosing a tire, in accordance with the invention, mounted on a water bag illustrating the position of the novel chafer during cure.

Figure 3 is a sectional view of a tire bead after vulcanization showing the undesirable position of the rubber coating of prior art chafers.

Figure 4 is a sectional view of a tire in accordance with the invention after vulcanization illustrating the position of the chafer.

In reference to Figure 1, a truck tire generally indicated at 1 containing a pneumatic tube 2 is mounted on a rim 5 associated with a locking ring 4. Each tire bead 3 is of metal wire construction held to the tire by the fabric plies and protected from rubbing a rim flange 7 and locking ring 4 by chafers 6 of the invention. Abrasion occurs during rotation of the wheel wherein slight play and wobble between the tire bead and the rim 5 causes the hard metal flange 7 and the locking ring 4 to rub against the respective beads of the tire.

Figure 2 shows a tire-curing mold 9 of the steam-heated type containing tire 1 enclosing a water bag 10. During vulcanization of the tire, pressures on the order of 175 lbs. per sq. in. are exerted outwardly against the inner walls of the water bag. These pressures combined with the heat of vulcanization which reaches temperatures as high as 325° F. would normally soften the rubber and force it away from the bead portion to expose the chafer fabric as shown in Figure 3 at 20. This flow of the rubber occurs because the shoulder of mold 9 adjacent to the chafer 6 of the bead abuts into the surface contour of the tire with the result that when heat and pressure are applied within the water bag, the chafer rubber normally is forced away from the chafer fabric at the bead portion adjacent to said mold shoulder. Tires prior to this invention when removed from the mold after the vulcanizing operation had a bead shape as represented in Figure 3 wherein chafer fabric 20 is only lightly covered with rubber as shown at 21. However, with the novel chafer 6 which is resistant to flow during cure, the chafer fabric is not laid bare during vulcanization and the desired rubber protective cover remains on the fabric as is shown at 6 in Figure 4.

The present invention provides a rubber compound which, after preliminary heating at a temperature below the normal vulcanizing temperature of a tire, has deformation characteristics resisting pressures and temperatures exerted during tire vulcanization. To obtain this end a rubber hydrocarbon material is mixed with a thermosetting resin material to provide a compound which when subjected to a temperature of approximately 212° F. attains a state substantially resistant to deformation. This state is attained usually at no sacrifice of building tack for the reason that with a treatment for short periods at a temperature of 212° F. the rubbery hydrocarbon component has not vulcanized sufficiently to destroy its tack or its ability to cure onto the sidewall of the tire even though the plastic material has stiffened to prevent subsequent deformation of the compound.

In the preferred form of the invention, it has been found that a mixture of a phenol-aldehyde resin with rubber containing curing ingredients for the resin as well as curing ingredients for the rubber, attains the desired properties. Natural rubber has proved satisfactory for this compound as well as other vulcanizable rubbery polymers such as copolymers of butadiene-styrene, polybutadiene, isobutylene-isoprene (e. g. GR–I, a low temperature polymer of a major proportion of isobutylene and a minor proportion of butadiene or isoprene), acrylonitrile-butadiene (e. g. GR–A) and polychlorobutadiene (e. g. neoprene or GR–M) may be used. Chafers may be prepared in view of the invention by using reclaim prepared by devulcanization of vulcanized articles made from these rubbery polymers. An example of the preferred form of the invention follows:

Example I

| | Parts by weight |
|---|---|
| Rubber hydrocarbon | 100 |
| Carbon black | 40 |
| Softener | 4.2 |
| Zinc oxide | 2.8 |
| Stearic acid | 1.4 |
| Sulfur | 2.8 |
| Rubber accelerator | .7 |
| Antioxidant | 1.0 |
| Durez 13355 [1] | 35 |
| EDF crystals [2] | 5.0 |
| | 192.9 |

[1] Phenol-formaldehyde resin manufactured by Durez Plastics & Chemicals, Inc.
[2] Condensation product of ethylene diamine and formaldehyde manufactured by Clopay Corp.

This stock was prepared by mixing on a two-roll mill, was calendered into a strip 2 inches wide and .060 inch thick, and was cured 2 hours at 212° F. in an oven. The cured strip possessed a Williams plasticity value of 6.20 and recovery value of 1.05. When built into a tire as a chafer, the cured strip did not flow during tire vulcanization and provided the desired protection to the bead from rim rubbing.

In those modifications of the invention where no tack is present after the initial heat treatment of the compound to stiffen the plastic or resin the chafer may be cemented with a rubber cement before it is applied to the tire. The compound of this invention may be mixed on an open-mill, in a Banbury type mixer or by any other apparatus familiar to those versed in the art of rubber mixing. The mixed compound then may be calendered onto fabric or calendered into rubbery strips for the chafer in the tire building operation.

A second compound comprising phenol-formaldehyde resin and natural rubber was prepared according to the following formula:

Example II

| | Parts by weight |
|---|---|
| Rubber hydrocarbon | 100 |
| Carbon black | 25 |
| Softener | 4.2 |
| Zinc oxide | 2.8 |
| Stearic acid | 1.4 |
| Sulfur | 2.8 |
| Antioxidant | 1 |
| Rubber accelerator | .7 |
| Durez 13355 | 35 |
| EDF crystals | 7.0 |
| | 179.9 |

The above stock was mixed on a mill, calendered into strips 2 inches wide and .060 in. thick, and heated in an oven at 212° F. for 2 hours. The Williams plasticity after the two hour heating was 7.41 with a recovery value of 1.91. The strip was built into the chafer construction of a tire and resisted abrasion satisfactorily.

A satisfactory chafer has been built by using a polythene resin blended with a vulcanizable rubbery material. For example, chlorosulfonated polythene resin when blended with rubber gives satisfactory results. A preferred formula of this modification of the invention is as follows:

Example III

| | Parts by weight |
|---|---|
| Rubber hydrocarbon | 100 |
| Hypalon [1] | 100 |
| Carbon black | 20 |
| Lead oxide | 20 |
| Softener | 8 |
| Zinc oxide | 3 |
| Stearic acid | 1.5 |
| Sulfur | 3 |
| Rubber accelerator | 2.8 |
| | 258.3 |

[1] Chlorosulfonated polythene resin manufactured by E. I. du Pont de Nemours & Co.

The above stock was mixed on a two-roll mill and strips 2 in. wide and .060 in. thick were calendered and cured for 2 hours at 212° F. in an oven to produce a cured strip exhibiting a Williams plasticity value of 5.56 and a recovery value of 1.86. The calendered strips were built into the chafer in an unvulcanized tire and the tire vulcanized without undesirable flow of the rubbery chafer stock. The chafer provided protection from rim flange rubbing when the tire was mounted on a vehicle wheel and road-tested.

Example IV

| | Parts by weight |
|---|---|
| Rubber hydrocarbon | 100.0 |
| Hypalon | 43.0 |
| Carbon black | 20.0 |
| Zinc oxide | 3.0 |
| Stearic acid | 1.5 |
| Softeners | 8.0 |
| Lead oxide | 9.0 |
| Sulfur | 3.0 |
| Rubber accelerator | 2.8 |
| | 190.3 |

The above stock was mixed on a two-roll mill and sheeted into slabs. After being heated for 2 hours at 212° F. in an oven, the Williams plasticity value of the compound was 8.50 and the recovery value 1.98. Upon further vulcanization at temperatures within the curing range of the rubber hydrocarbon component the compound attained a tough, flexible abrasion resistant condition. All Williams plasticity tests were made by means of a Williams plastometer, as described on page 254 of The Vanderbilt 1942 Rubber Handbook published by the R. T. Vanderbilt Co., with the exception that the temperature of test was 100° C. instead of 70° C. as described.

It is thought that the Hypalon resin forms a tough, stable matrix around the rubber component of the composition of the invention when such composition is heated at a temperature below the vulcanization temperature of the rubber component. This matrix holds the rubber compound in the desired position, against deforming pressures during further heating of the compound at the vulcanization temperature of the rubber. However, regardless of the mechanism involved, the fact remains that a Hypalon resin with a vulcanizable rubber hydrocarbon performs satisfactorily in the present invention.

Some of the phenol-aldehyde type resins acceptable for use in the invention include the following: phenol-acetaldehyde, phenol-furfuraldehyde, cresol-formaldehyde, cresol-acetaldehyde, cresol-furfuraldehyde, resorcinol-formaldehyde, resorcinol acetaldehyde, resorcinol-furfuraldehyde; substituted cresols, xylenols, naphthols, hydroquinone or phenols condensed with formaldehyde, acetaldehyde, furfuraldehyde, butyraldehyde or propionaldehyde; as well as resins of the melamine-aldehyde type such as melamine-acetaldehyde, melamine-formaldehyde, melamine-furfuraldehyde, along with others.

Among the curing agents available for the phenol-aldehyde component of the invention are the reaction product of cyclohexylamine and formaldehyde, bases such as hexamethylenetetramine, sodium carbonate, calcium oxide, barium oxide and others. Various other curing agents known to those skilled in the resin art may be used to stiffen the thermosetting resin and the invention is not limited to those listed.

For the rubbery materials used in the invention many accelerators are known to the art. Among those available are the thiazoles, the dithiocarbamates, the thiuram sulfides, for example, benzothiazole disulfide, mercaptobenzothiazole, cyclohexylbenzothiazole sulfenamide and zinc dimethyl dithiocarbamate. Magnesium oxide among others is useful for accelerating the polychloro-butadiene types of polymers. Also available are the aldehydeamine and guanidine type accelerators such as formaldehyde-ammonia and diphenylguanidine, and many more known to those versed in the art of rubber compound.

What is claimed is:

1. In a method of building a pneumatic tire having a bead portion protected by a chafer portion, the steps of mixing a rubbery compound comprising two components characterized by different stiffening temperatures, calendering said compound onto fabric, subjecting said fabric to a temperature sufficiently high to stiffen only one component of said rubbery compound, applying said fabric to the bead portion of said tire to form a chafer portion and vulcanizing said tire with heat and pressure, whereby the second component is vulcanized without substantial flow of said compound relative to said fabric.

2. In the construction of a pneumatic tire containing beads protected by a chafer portion characterized by the absence of fabric support, the method of manufacturing the chafer portion comprising the steps of mixing a rubbery compound comprised of two components stiffenable at different temperatures, forming an unvulcanized chafer strip from said compound, subjecting said chafer strip to the temperature of stiffening of one of said components to leave the other of said components unstiffened, building said chafer strip into said tire to form a chafer portion and vulcanizing said tire by means of heat and pressure whereby said chafer strip retains substantially said desired thickness.

3. In the manufacture of a pneumatic tire, wherein the tire is vulcanized and shaped under heat and pressure, the method of forming the chafer of said tire comprising the steps of mixing a rubbery compound comprising two components, one of said components comprising the condensation product of a hydroxy derivative of an aromatic hydrocarbon with an aldehyde, and the other of said components comprising a vulcanizable rubbery material, forming a chafer strip from said compound, heating said strip to a temperature sufficiently high to stiffen said condensation product but not to vulcanize said rubbery material, building said chafer strip into an unvulcanized tire, and subjecting said tire to temperature and pressure sufficient to vulcanize said tire.

4. In the manufacture of a pneumatic tire wherein the tire is vulcanized and shaped under heat and pressure, the method of forming the chafer of said tire comprising the steps of mixing a rubbery compound comprising two components, one of said components comprising a condensation product of phenol with formaldehyde, and the other of said components comprised of a vulcanizable rubbery material, forming a chafer strip from said compound, heating said strip to a temperature sufficiently high to stiffen said condensation product but not to vulcanize said rubbery material, building said strip into an unvulcanized tire, and subjecting said tire to temperature and pressure sufficient to vulcanize said tire.

5. In the manufacture of a pneumatic tire wherein the tire is vulcanized and shaped under heat and pressure, the method of forming the chafer portion of said tire comprising the steps of mixing a rubbery compound comprising two components, one of which stiffens at a temperature range of from 190° to 220° F. and the other which stiffens at a temperature above 260° F., forming an unvulcanized chafer strip from said compound and subjecting said chafer strip, prior to its assembly in the tire, to a temperature of not over 220° F. to stiffen said one component whereby said chafer strip retains its shape and desired position in said tire under vulcanizing heat and pressure while said other component and the remainder of the tire is vulcanized.

6. In the manufacture of a pneumatic tire wherein said tire is vulcanized and shaped under heat and pressure the method of forming the chafer of said tire comprising the steps of mixing a rubbery compound comprising two components, one of said components comprising a chlorosulfonated polyethylene resin, and the other of said components comprised of a vulcanizable rubbery material, forming a chafer strip from said compound, heating said strip to a temperature sufficiently high to stiffen said resin but not to vulcanize said rubbery material, building said strip into an unvulcanized tire, and subjecting said tire to temperature and pressure sufficient to vulcanize said tire.

7. In a method of building a molded laminated vulcanized rubbery article having an outer rubbery strip vulcanized to an inner strip subjected to heat and deforming pressure during molding and vulcanization, the steps of mixing a rubbery compound comprising two components, one of which is a copolymer of isobutylene and isoprene, said components characterized by different stiffening temperatures, forming an unvulcanized first portion from said compound, subjecting said first portion to a temperature sufficiently high to stiffen only one component of said compound, applying said portion to a second portion having a surface of a vulcanizable rubbery material to therewith form an unvulcanized rubbery second article and vulcanizing said article with heat and pressure, whereby the second component is stiffened without substantial flow of said isoprene component relative to said second layer.

8. In a method of building a molded laminated vulcanized rubbery article having an outer rubbery strip vulcanized to an inner strip subjected to heat and deforming pressure during molding and vulcanization, the steps of mixing a rubbery compound comprising two components, one of which is natural rubber, said components characterized by different stiffening temperatures, forming an unvulcanized portion from said compound, subjecting said first portion to a temperature sufficiently high to stiffen only one component of said compound, applying said portion to a second portion having a surface of a vulcanizable rubbery material to therewith form an unvulcanized rubbery second article and vulcanizing said article with heat and pressure, whereby the second component is stiffened without substantial flow of said natural rubber component relative to said second layer.

9. In a method of building a laminated vulcanized rubbery article having an outer rubbery strip vulcanized to an inner strip subjected to heat and deforming pressure during molding and vulcanization, the steps of mixing a rubbery compound comprising two components, one of which is polychlorobutadiene, said components characterized by different stiffening temperatures, forming an unvulcanized portion from said compound, subjecting said first portion to a temperature sufficiently high to stiffen only one component of said compound, applying said portion to a second portion having a surface of a vulcanizable rubbery material to therewith form an unvulcanized rubbery second article and vulcanizing said article with heat and pressure, whereby the second component is stiffened without substantial flow of said polychlorobutadiene component relative to said second layer.

10. In a method of building a laminated vulcanized rubbery article having an outer rubbery strip vulcanized to an inner strip subjected to heat and deforming pressure during molding and vulcanization, the steps of mixing a rubbery compound comprising two components, one of which is a copolymer of butadiene and styrene, said components characterized by different stiffening temperatures, forming an unvulcanized portion from said compound, subjecting said first portion to a temperature sufficiently high to stiffen only one component of said compound, applying said portion to a second portion having a surface of a vulcanizable rubbery material to therewith form an unvulcanized rubbery second article and vulcanizing said article with heat and pressure, whereby the second component is stiffened without substantial flow of said butadiene-styrene component relative to said second layer.

References Cited in the file of this patent

UNITED STATES PATENTS

| | | |
|---|---|---|
| 2,000,869 | Taylor | May 7, 1935 |
| 2,211,048 | Bitterich | Aug. 13, 1940 |
| 2,313,035 | Breth | Mar. 9, 1943 |
| 2,416,060 | McAlevy | Feb. 18, 1947 |
| 2,458,841 | Elmore | Jan. 11, 1949 |
| 2,595,423 | Sternad | May 6, 1952 |
| 2,598,289 | Newman | May 27, 1952 |
| 2,605,248 | Fisk | July 29, 1952 |
| 2,625,980 | Castricum | Jan. 20, 1953 |
| 2,625,981 | Wallace | Jan. 20, 1953 |
| 2,729,608 | Strain | Jan. 3, 1956 |

OTHER REFERENCES

Hypalon, No. X–8, published by Dupont, Wilmington, Delaware, March 12, 1951, page 1. (Copy in Div. 50.)

Rubber Age, May 1952, pages 205–221.

Hypalon, S–2, No. X–35, published by Dupont, Wilmington, Delaware, April 18, 1952, 7 pages. (Copy in Div. 50.)